United States Patent [19]

Berg, Jr. et al.

[11] 4,132,489
[45] Jan. 2, 1979

[54] COUPLING UNIT FOR CONNECTING POLES IN AN END-TO-END RELATIONSHIP

[76] Inventors: Albert T. Berg, Jr.; Howard Langlie, both of Ellendale, Minn. 56026

[21] Appl. No.: 831,940

[22] Filed: Sep. 9, 1977

[51] Int. Cl.² .............................................. F16B 7/00
[52] U.S. Cl. .................................... 403/305; 403/322; 403/330; 16/115; 15/143 B
[58] Field of Search ............... 403/305, 313, 300, 330, 403/329, 326, 321, 322, 356, 301, 309, 310, 306; 16/115, 110 R, 114 R; 15/143 B, 143 R

[56] References Cited

U.S. PATENT DOCUMENTS

| 34,769 | 3/1862 | Northrup | 403/310 |
|---|---|---|---|
| 883,499 | 3/1908 | Smith | 403/305 |
| 1,954,048 | 4/1934 | Jeffery et al. | 403/330 |
| 3,145,406 | 8/1964 | Lay | 403/326 X |
| 3,686,896 | 8/1972 | Rutter | 403/305 |

FOREIGN PATENT DOCUMENTS 956036 4/1964 United Kingdom ..................... 403/326

Primary Examiner—Andrew V. Kundrat
Attorney, Agent, or Firm—Stuart R. Peterson

[57] ABSTRACT

The plastic coupling unit includes oppositely directed tubular body portions, each having a circular opening at one end leading into its bore for receiving therein one end of a pole. Each tubular body portion is provided with a resiliently mounted tongue carrying at its free end a latch member that projects through a rectangular side opening into its bore so as to be engageable with a notch in the inserted end of the pole. A longitudinal key is contained in each bore and each inserted pole end has a keyway for receiving a key. In addition, the bores are formed with resilient ribs having sawtooth splines thereon that press against the pole end so that the two pole ends are firmly held by the coupling unit. Any number of coupling units can be employed in order to connect a desired number of poles in an end-to-end relationship.

3 Claims, 12 Drawing Figures

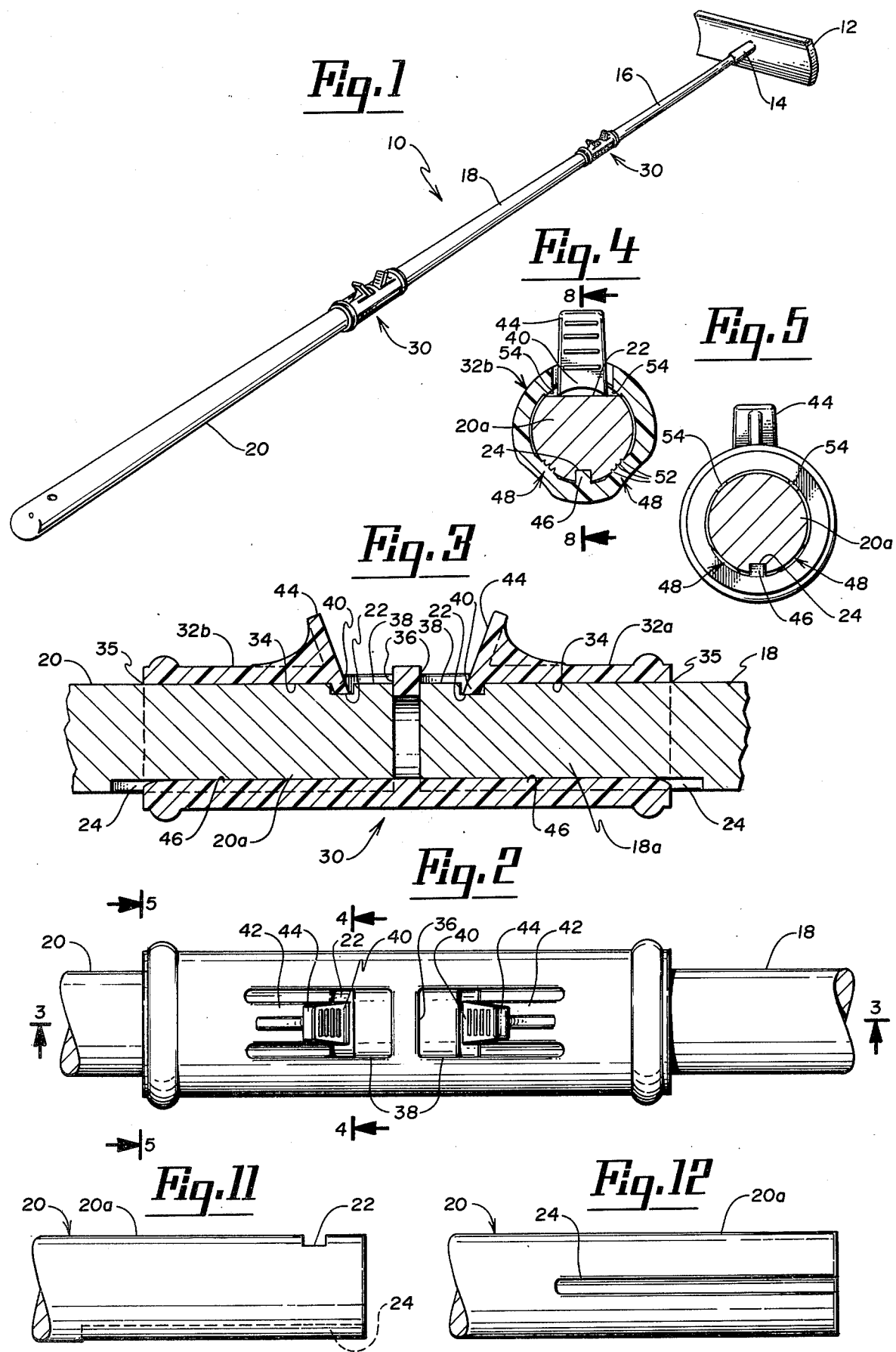

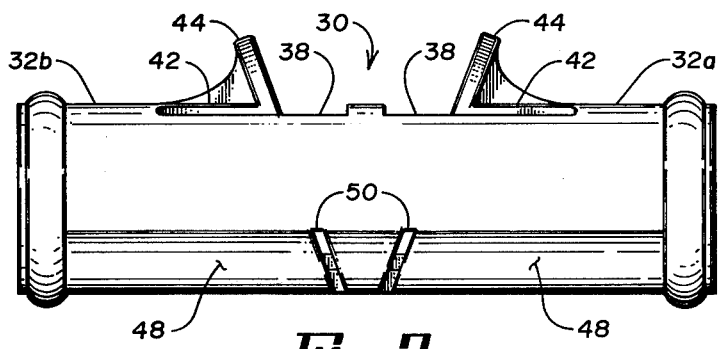
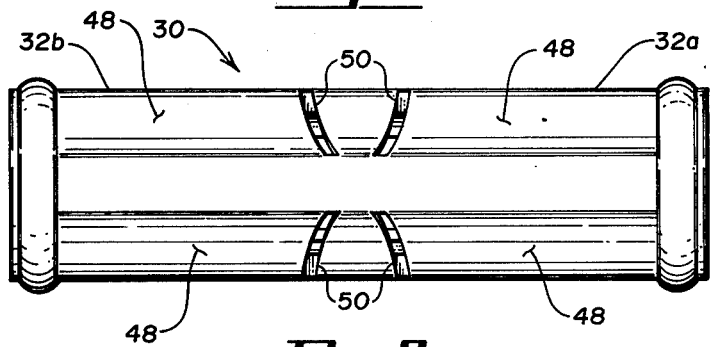
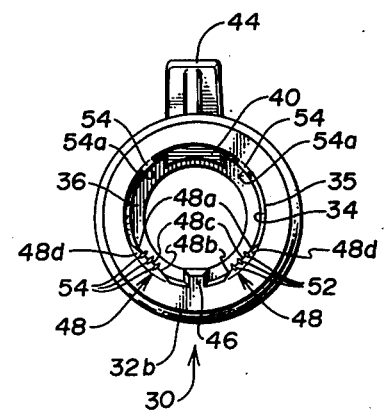
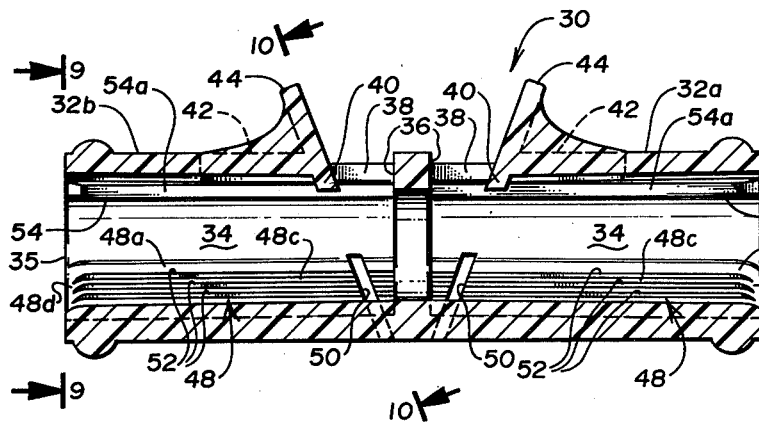
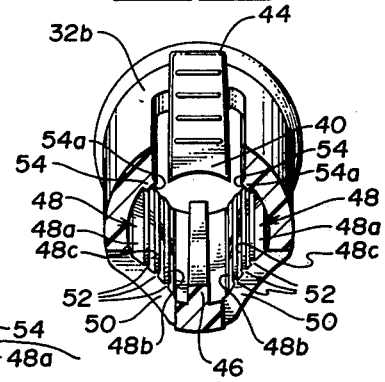

COUPLING UNIT FOR CONNECTING POLES IN AN END-TO-END RELATIONSHIP

BACKGROUND OF THE INVENTION

This invention relates generally to couplings, and pertains more particularly to a plastic coupling for connecting wooden poles or the like in an end-to-end relationship.

SUMMARY OF THE INVENTION

An object of the present invention is to couple or connect poles in an end-to-end relationship so that the effective length thereof can be greatly increased.

Another object of the invention is to provide a coupling unit that not only holds poles and the line in an end-to-end relationship but which permits the poles to be readily connected and disconnected. In this regard, it will be appreciated that storage space frequently does not exist for accommodating poles of any great length. Besides, permanently long poles can at times be unwieldy because of the difficulty experienced in maneuvering them into a useful position in the performance of certain tasks. Yet when the length of shorter poles is to be increased, it is highly desirable that the extension be quickly achieved at the site where the poles are to be used. Therefore, an aim of our invention is to provide a coupling unit in which the poles can be easily latched together in the desired end-to-end configuration and also equally easily unlatched when the poles are to be separated.

Another object is to provide a coupling unit that will firmly retain the poles in their end-to-end relationship, thereby effecting a connection of poles in such a manner that they function as a single pole of corresponding length. Actually, our coupling unit imparts greater rigidity to the combined poles than would result from a single pole because the coupling unit prevents whipping or flexing where the poles are connected.

Yet another object of the invention is to provide a coupling unit that will be extremely long-lasting, especially in that no metal parts are required.

Another object is to provide a one-piece coupling unit that can be inexpensively molded from plastic material. More specifically, an aim of the invention is to obviate the need for any assembling of parts as far as the construction of our coupling unit is concerned.

Still further, an object is to provide an coupling unit that will be rugged and sturdy, and at the same time not noticeably increase the overall weight of the coupled poles. This feature becomes particularly important where the end-to-end pole configuration is to be held near one end and manipulated in a cantilever fashion.

Quite briefly, our invention contemplates the use of a one-piece plastic coupling unit having oppositely directed tubular body portions, each having an opening therein through which a latch or dog member extends. When the ends of two poles are inserted into the bores of the tubular body portions constituting a coupling unit, grooves or notches formed in the received ends of the poles will be automatically engaged by the dog members and the poles thus held together. Owing to the resiliency of the tongues on which the dog members are carried, the tongues can be manually flexed outwardly so as to unlatch either or both of the dog members and thus release the coupled poles. Keys and keyways prevent the poles from twisting within the coupling unit, and sawtooth splines formed on resilient ribs bear against the poles to prevent wobbling.

BRIEF DESCRIPTION OF THE DRAWING

FIG. 1 is a perspective view of a snow puller employing two coupling units exemplifying our invention;

FIG. 2 is a top plan view of one of the coupling units used in FIG. 1 with fragmentary portions of two poles being shown;

FIG. 3 is a sectional view taken in the direction of line 3—3 of FIG. 2;

FIG. 4 is a sectional view taken in the direction of line 4—4 of FIG. 2;

FIG. 5 is a sectional view taken in the direction of line 5—5 of FIG. 2;

FIG. 6 is a side elevational view of one of the units prior to inserting pole ends therein;

FIG. 7 is a bottom plan view of FIG. 6;

FIG. 8 is a sectional view taken in the direction of line 8—8 of FIG. 4 but without any poles;

FIG. 9 is an end view taken from the left in FIG. 8, the view being in the direction of line 9—9;

FIG. 10 is a sectional view taken in the direction of line 10—10 of FIG. 8;

FIG. 11 is an elevational view of one end portion of one of the poles prior to being inserted into our coupling unit, and FIG. 12 is a bottom plan view of FIG. 11.

DESCRIPTION OF THE PREFERRED EMBODIMENT

Various situations exist where it is desirable to connect poles together in an end-to-end relationship. One example where our invention will find utility is in conjunction with tree saws where the pruning of limbs located at considerable heights can more expeditiously be conducted from ground level if the limbs can be reached. Single wooden poles of considerable length can be quite awkward, cumbersome and heavy. Therefore, shorter poles when attached in an end-to-end manner are far more practical.

However, in order to illustrate a simple, yet practical application of our invention, a snow puller has been denoted generally by the reference numeral 10 in FIG. 1. The snow puller 10 conventionally includes a blade 12 having a tubular sleeve 14 to which is attached in any suitable manner an elongated handle 16. As with tree saws, snow pullers may utilize multiple pole lengths in order that the puller can be better manipulated by a person standing on the ground when snow is to be removed from a sloping roof.

Therefore, the exemplary snow puller 10 includes a first extension pole 18 and a second extension pole 20. It will be somewhat simpler to describe only the adjacent end portions 18a, 20a of the two poles 18, 20, respectively. Therefore, it is to be discerned from FIG. 3 (and also from FIGS. 6 and 7 as far as the end portion 20a is concerned) that each adjacent end portion has a transverse notch 22 therein. Also, it will be observed that the end portions 18a and 20a each have a longitudinal keyway 24 therein, FIG. 12 showing this keyway quite clearly.

The snow puller 10 shown in FIG. 1 makes use of two identical coupling units 30 constructed in accordance with the teachings of our invention. Inasmuch as the coupling units 30 are identical, only one such unit need be described in detail. Therefore, referring to the unit 30 at the left in FIG. 1 and which is shown on a larger scale in FIGS. 2, 3, 6, 7 and 8, it will be discerned that the unit 30, which is molded in one piece from a suitable plastic (such as polyethylene), includes oppositely directed tubular body portions 32a and 32b, each having a generally cylindrical (but not truly cylindrical because of certain ribs yet to be referred to) bore 34 therein with a circular opening or entrance at 35. Where the tubular body portions 32a and 32b are integrally joined there is a flange 36 that extends inwardly. Stated somewhat differently, opposite sides of the flange 36 define the inner ends of the two bores 34.

As can be seen in FIG. 2, and also in FIGS. 3 and 8 each tubular body portion 32a, 32b is provided with a rectangular opening 38. Extending inwardly through the opening 38 into the bore 34 in each instance is an inclined dog or sloping latch member 40 carried at the free end of a resilient tongue 42. Stated somewhat differently, the member 40 is at an angle with respect to the axis of the tongue 42. In order to actuate manually the latch member 40, the free end of the resilient tongue 42 also has mounted thereon a thumb tab 44.

It will be observed from FIGS. 4, 5, 9 and 10 that the tubular body portion 32b, as does the portion 32a, has a longitudinal key 46 extending inwardly. The key 46 in each instance is configured so as to fit within the earlier-mentioned keyway 24, there being a keyway 24, of course, in each of the extension poles 18, 20.

In addition to the longitudinal key 46, there are two flexible or resilient ribs 48 extending longitudinally along the bore 34, the ribs being to either side of the key 46. More specifically, each rib 48 has a central plateau or platform 48a and sloping side surfaces 48b, 48c (best seen in FIG. 10) plus an inclined surface or ramp 48d (best seen in FIG. 8) adjacent the opening 35.

In order to enhance the resiliency of the ribs 48, which resiliency or flexibility is made use of for a purpose presently to be explained, each rib 48 has an angularly disposed slit 50 adjacent one end thereof, more specifically, the end thereof nearer the flange 36. Several sawtooth splines 52 project inwardly from each plateau or platform 48a, these splines extending from the ramp 48d in each instance to the flange 36, although interrupted by the slits 50.

Diametrically located opposite each of the ribs 48 is a rib 54, the ribs 54 having flat surfaces 54a (best seen in FIG. 9) in contradistinction to the tooth plateaus 48a. However, the key 46 projects farther into the bore 34 of each tubular body portion 32a and 32b than do the sawtooth splines 52. In this way, the key 46 can be received in the keyway 24.

Although not shown in the drawing, it will be appreciated that the left end of the handle 16 of the snow puller 10 is configured in the same manner as is the left end of the extension pole 18, this being the end portion 18a received in the tubular body portion 32a of FIG. 3.

With the foregoing in mind, it will be understood that when using our coupling unit 30, the first unit 30 at the right in FIG. 1 would be pressed onto the elongated handle 16 and then the right end of the first extension pole 18 would be pressed thereinto, the right end of the extension pole 18 being configured in the same fashion as the right end portion 20a of the extension pole 20 which is shown received in the tubular body portion 32b. However, it will suffice in explaining the use of our invention to now refer specifically to the particular coupling unit 30 shown at the left in FIG. 1.

Therefore, the tubular body portion 32b is pressed onto the left end portion 18a of the extension pole 18. When this is being done, the end of the pole 18 is advanced or inserted into the bore 34 of the tubular body portion 32b. Of course, the keyway 24 on the left end of the extension pole 18 must be angularly aligned with the longitudinal key 46 of the tubular body portion 32b before the end of the pole 18 will enter the tubular body portion 32b. Continued pressing or forcing of the unit 30 onto the extension pole 18 causes the left end of the extension pole 18 to soon abut the latch member 40. Owing to the slope or inclination of the latch member 40, the latch member 40 is automatically urged or cammed outwardly, the resiliency inherent in the tongue 42 permitting this. Complete insertion of the left end of the extension pole 18 causes it to strike the right side of the flange 36, the flange 36 serving as a stop.

During the insertion, the sawtooth splines 52 bear against the pole end portion 18a, and depending upon the hardness or softness of the pole 18, the splines 52 may either compress or they dig into the pole by reason of the relative movement. Since the preferred material forming the coupling unit 30 will be polyethylene, and some poles harder and some softer than this plastic, depending upon the type of wood used for the poles 18, 20, the coupling unit 30, owing to its construction, adapts to the particular type of wood, the splines 52 either flatening or cutting into the wood, as the case may be. The accommodation of different poles 18, 20 is also enhanced by reason of the resiliency imparted to the ribs 48, especially as augmented due to the slits 50.

It is important to appreciate, though, that when the notch 22 reaches the latch member 40, which has been riding against the end portion 18a, the latch member 40 now snaps into the notch 22 and thereafter precludes withdrawal of the extension pole 18. However, by pressing on the thumb tab 44, the tongue 42 on the tubular body portion 32b will be retracted from the notch 22 to release the end portion 18a. The pole 18 can then be pulled from the unit 30, or the unit 30 pulled from the pole.

Assuming that the coupling unit 30 has been attached to the extension pole 18 in the manner outlined above, then the end portion 20a of the second extension pole 20 is inserted into the bore 34 of the tubular body portion 32b. The same action transpires, for when the notch 22 on the end portion 20a reaches the latch member 40 of the tubular body portion 32a, then the latch member 40, owing to the resiliency of the tongue 42 on which it is carried, snaps into the notch 22. Consequently, the same latched or locked condition realized with the pole 18 is effected with the pole 20. Of course, pressing on the thumb tab 44 will permit the resilient tongue 42 of the tubular body portion 32b to flex so as to retract the latch member 40 from the notch 22 at the left in FIG. 3, thereby unlatching or releasing the pole 20 when it is desired to do this.

One nicety of our invention is that any reasonable number of poles can be connected in an end-to-end relationship by using an appropriate number of our coupling units 30. The connection is very easily achieved, there being merely a gentle pressing action required. A force only sufficient to overcome the resistance of the sawtooth splines 52 and/or the resilient gripping action is provided by the ribs 48. On the other hand, when the poles are to be taken apart, such as for storing, only a simple actuation of the tabs 44 is needed and the poles can then be pulled from the coupling unit 30.

While the invention will have utility as far as snow pullers are concerned, this being because snow pullers are stored during warm weather and also because garages and other storage places simply are not large enough to accommodate the full length of the handle needed to reach the snow on roofs, it will again be mentioned that the invention will be of benefit in other situations where added pole length is of importance.

We claim:

1. A coupling unit comprising a tubular body portion provided with an opening, a resilient tongue, a latch member mounted on the free end of said tongue and extending angularly through said opening into the bore of said tubular body portion, a longitudinal key projecting into said bore from said tubular body portion, and a plurality of longitudinal sawtooth splines projecting into said bore from said tubular body portion, said key projecting farther into said bore than said splines.

2. A coupling unit comprising a pair of tubular body portions each provided with an opening, a resiliently mounted latch member projecting through each of said openings into the bore of its said tubular body portion, each of said tubular body portions having a longitudinal key projecting into its bore and each of said tubular body portions also having a plurality of longitudinal sawtooth splines projecting into its bore, said keys projecting farther into said bores than said splines.

3. In combination, a coupling unit having a tubular body portion provided with an opening and a resiliently mounted latch member projecting through said opening into the bore of said tubular body portion, a pole having a notch nearer one end thereof, said latch member extending into said notch when said one end of said pole is received in the bore of said tubular body portion, said tubular body portion having a longitudinal key projecting into said bore, said pole having a longitudinal keyway for receiving said key therein, said coupling unit including a second tubular body portion extending oppositely from said first tubular body portion, said second tubular body portion also being provided with an opening and having a resiliently mounted latch member projecting through said second opening into the bore of said second tubular body portion, a second pole having a second notch in one end thereof, said second latch member extending into said second notch when said one end of said second pole is received in the bore of said second tubular body portion, a resilient tongue for each of said latch members, said latch members being mounted on the free ends of said tongues and each latch member sloping angularly from its said tongue and in a direction away from the entrances of said bores so as to be cammed outwardly by said one end of said poles as said one ends are advanced into the bores of said tubular body portions, each of said tubular body portions having a longitudinal key projecting into its particular bore and each of said poles having a longitudinal keyway for receiving therein one of said longitudinal keys, each of said tubular body portions having a plurality of longitudinal sawtooth splines projecting inwardly into its said bore, said keys projecting farther into said bores than said splines.

* * * * *